United States Patent
Rao

(10) Patent No.: US 6,456,251 B1
(45) Date of Patent: Sep. 24, 2002

(54) RECONFIGURABLE ANTENNA SYSTEM

(75) Inventor: Sudhakar Rao, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/859,546

(22) Filed: May 17, 2001

(51) Int. Cl.$^7$ .............................. H01Q 1/28; H01Q 3/02
(52) U.S. Cl. .................... 343/757; 343/781 P; 342/355
(58) Field of Search ........................... 343/757, DIG. 2, 343/781 R, 781 P, 840, 776, 786; 342/354, 355; H01Q 1/28, 19/18, 3/02

(56) References Cited

U.S. PATENT DOCUMENTS

| | | | |
|---|---|---|---|
| 4,355,313 A | * 10/1982 | Hubert | .................. 343/DIG. 2 |
| 4,375,878 A | * 3/1983 | Harvey et al. | ......... 343/DIG. 2 |
| 5,870,060 A | * 2/1999 | Chen et al. | ............ 343/DIG. 2 |
| 5,936,588 A | 8/1999 | Rao et al. | |

* cited by examiner

Primary Examiner—Michael C. Wimer
(74) Attorney, Agent, or Firm—Terje Gudmestad

(57) ABSTRACT

A two-step method is used to reconfigure beams among different orbital slots for a satellite system. The satellite is biased at one or more orbital slots for a back-up mission, while it looks at the sub-satellite point for the primary mission. Body steering is achieved using pitch and roll biases. The main reflector of the antenna is gimballed in order to steer the beams to different locations for the back-up mission. Beam size is controlled through the use of different sized reflectors and by varying the feed size. Different sized beams are interleaved among multiple reflectors.

6 Claims, 12 Drawing Sheets

RECONFIGURABLE ANTENNA SYSTEM

TECHNICAL FIELD

The present invention relates generally to antenna systems, and more particularly to a reconfigurable antenna system for a satellite capable of operating in multiple orbits.

BACKGROUND ART

In satellite communications systems, signals are typically beamed between satellites and fixed coverage areas on Earth. With the expanding applications of satellites for many different aspects of communications, market requirements are continuously changing. Accordingly, a satellite must be capable of adapting to changes in the location of the requests for service.

There are many applications where the satellite is required to provide certain coverage beams for a primary mission and also serves as an in-orbit spare for a back-up mission providing coverage to a different set of beams. For example, satellites that provide local television channels to various designated market areas where the satellite is required to cover certain areas for a primary mission and a completely different set of market areas for a back-up mission. Thus antennas provided on satellites must be capable of reconfigurable coverages.

A reconfigurable multiple beam phased array antenna is an ideal solution to the ever changing beam coverage requirements. Beam coverage can be in the form of a number of spot beams and regional beams located over specific regions. Spot beams cover discrete and separate areas such as cities and counties. Regional beams cover larger areas such as countries. Regional beams are generated by combining a plurality of spot beams. Spot beams are generated by energizing radiating elements with selected amplitudes and phases. A reconfigurable multiple beam phased array antenna should be capable of reconfiguring the location of the beams, the size of the beams, and the power radiated in each beam.

Prior art reconfigurable multiple beam phased array antennas have uniform sized beams and employ a large number of phase shifters, which are used to steer the beams. The number of phase shifters is typically the number of elements multiplied by the number of beams, which results in a large, complex system. Further, the prior art reconfigurable multiple beam phased array antennas have limited bandwidth due to frequency scanning of the beams. The limited bandwidth causes the antenna gain and the co-channel interference to degrade.

In an attempt to address these problems, a reconfigurable multiple beam phased array antenna employing a two-dimensional stack of Rotman lenses in a low level beam forming network has been suggested as described in U.S. Pat. No. 5,936,588. However, this complex method of reconfiguring beams uses a phased array antenna with an active beamforming network. This is a very expensive solution in that the system requires a large number of amplifiers, active components and beamformers.

There is a need for a simple and efficient method of reconfiguring antenna beams among different orbital slots of a communication satellite with moderate flexibility.

SUMMARY OF THE INVENTION

It is an object of the present invention to provide a simple and efficient method for reconfiguring antenna beams among different orbital slots of a communication satellite. It is another object of the present invention to reconfigure the antenna in conjunction with body-biasing the satellite.

It is a further object of the present invention to bias the body of the satellite at one or more orbital slots for a back-up mission and have no body-bias for the primary mission while gimballing the antennas to steer the beams for the back-up mission.

A two-step method is used to reconfigure beams among different orbital slots. The satellite is biased at one or more orbital slots for a back-up mission, while it looks at the sub-satellite point for the primary mission. Body steering is achieved using pitch and roll biases.

The main reflector of the antenna is gimballed in order to steer the beams to different locations for the back-up mission. Beam size control is achieved through the use of different sized reflectors and by varying the feed size.

There are several advantages to the method of the present invention. Typically, scanning beams results in a reduction in performance. With the present invention, beam reconfiguration is possible over widely separated orbital slots due to main reflector gimballing, which reduces effective beam scanning by half compared to conventional methods and therefore, causes minimum degradation to the beam patterns.

These and other features of the present invention will be better understood with regard to the following description, appended claims, and accompanying drawings.

BEST MODE FOR CARRYING OUT THE INVENTION

Figure 1:
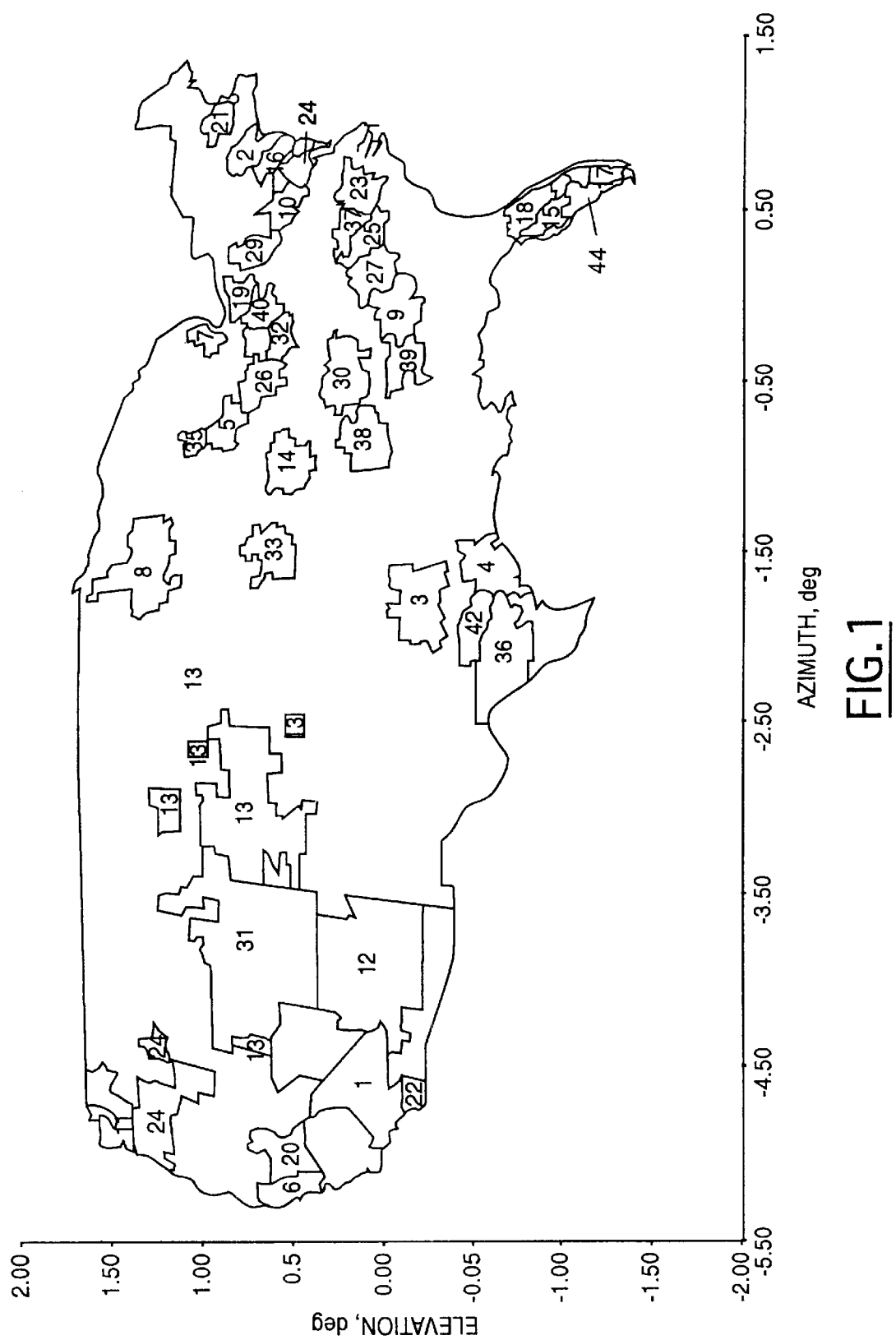
FIG. 1 is a diagram of typical coverage for a plurality of designated market areas (DMA's) in a 101 W orbital slot, the primary mission for the present example.

Referring to FIG. 1 there is shown typical coverage for a plurality of designated market areas (DMA's). The numbers inside the divisions shown in FIGS. 1 through 3 and 7 through 10 represent the ranking of the DMA's. Therefore, the division marked 1 found near Los Angeles, CA indicates the importance of the DMA relative to the remaining DMA's.

In the present example, FIG. 1 shows local television transmission and shaped beam for the Continental United States, (CONUS) from a 101 West longitude (W) orbital slot, which is designated as the primary mission for the present example. In the primary mission, a fixed number of DMA's are covered by several spot beams using a predetermined number of channels available on board the spacecraft and reusing the frequency. The outer contour of FIG. 1 is the shaped coverage for CONUS and uses different frequency channels than the spot beams for direct-to-home broadcast service.

Figure 2:
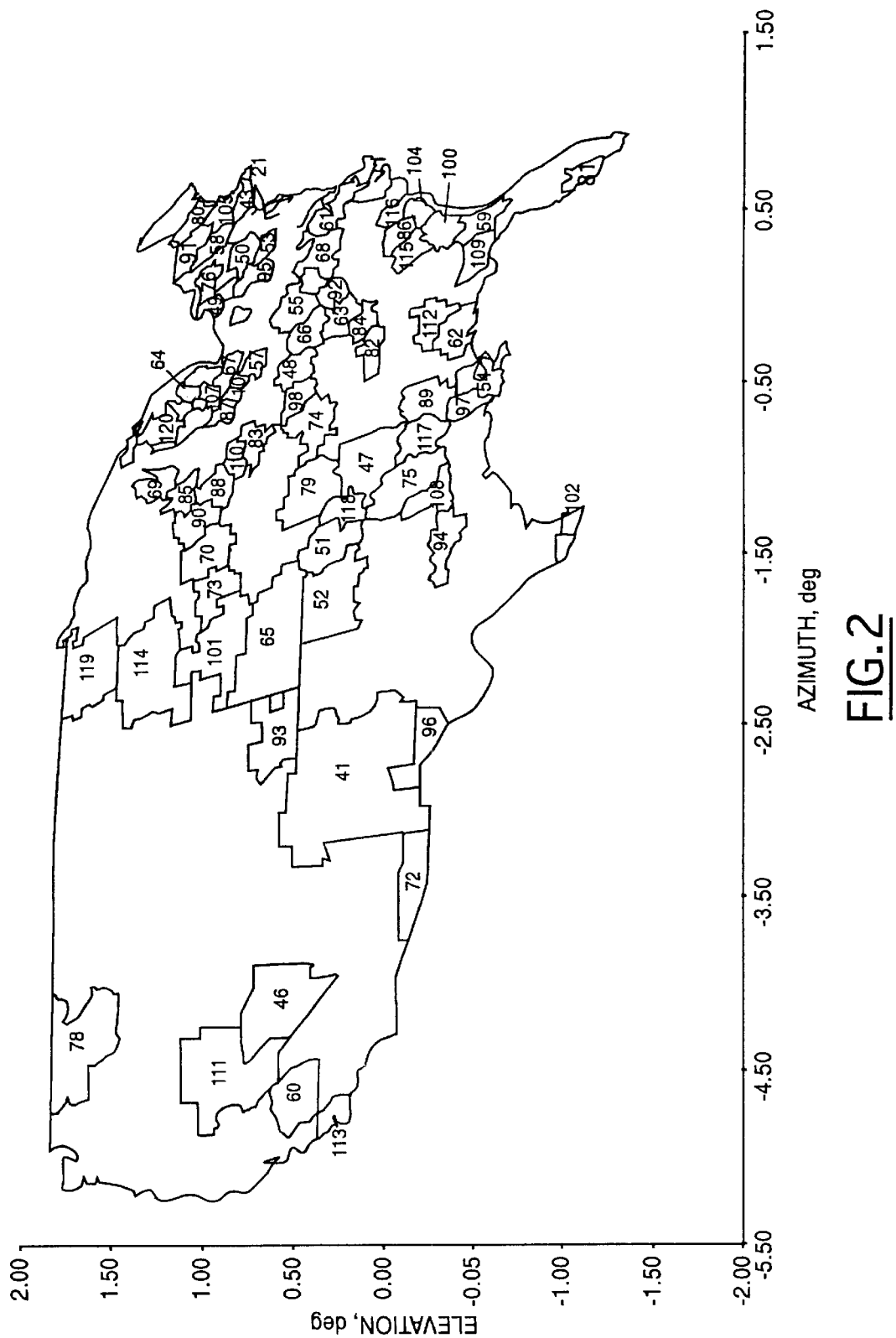
FIG. 2 is a diagram of typical coverage for a plurality of DMA's in a 119 W orbital slot, the secondary mission for the present example.
Figure 3:
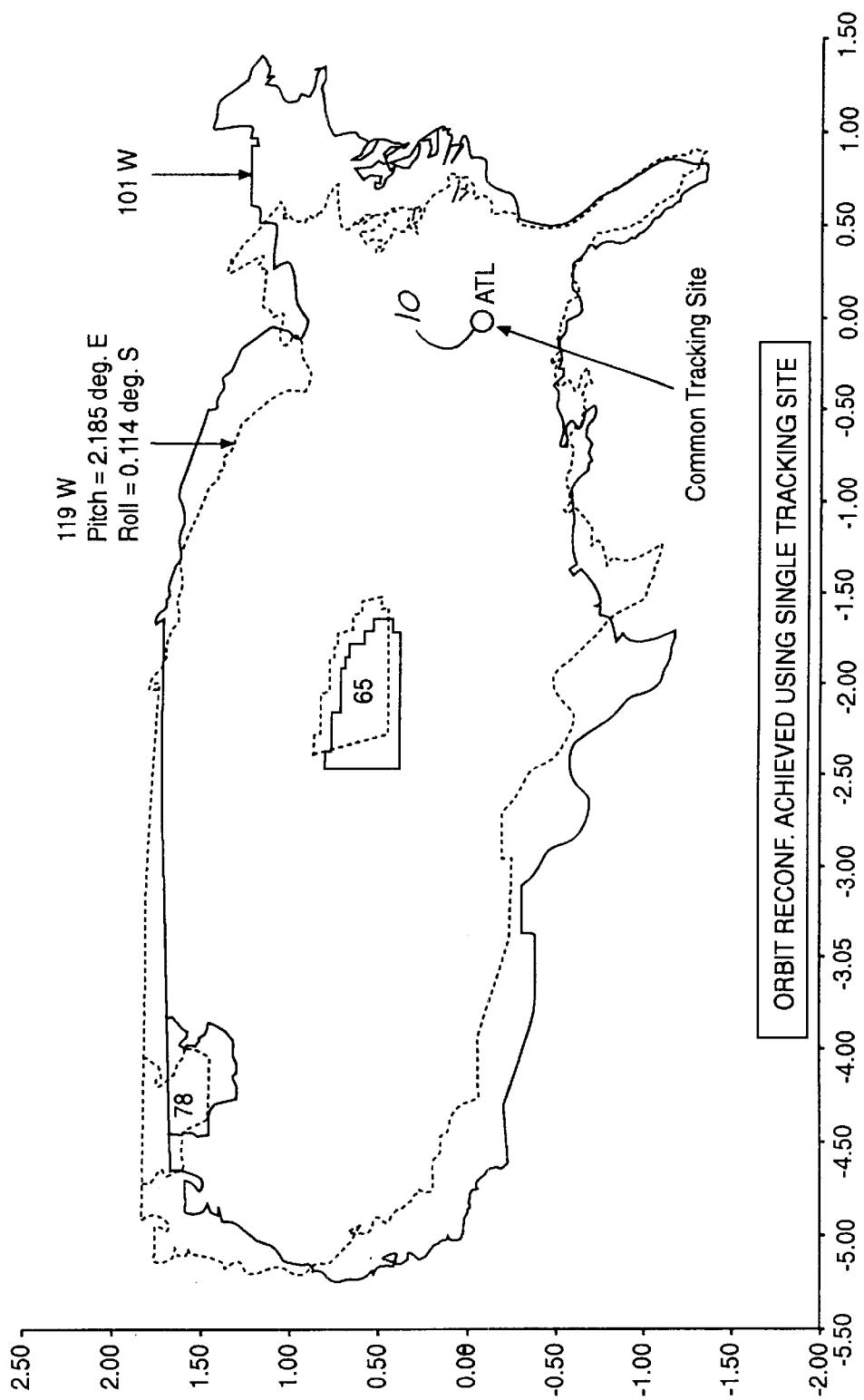
FIG. 3 is a diagram of the composite coverage for the primary and secondary missions as a result of the method of the present invention.

FIG. 2 is typical coverage for a plurality of DMA's and the outer periphery shows the shaped beam coverage for CONUS from a 119 W orbital slot and is designated as the secondary, or back-up, mission for the present example. The present invention is a simple and efficient method for reconfiguring the antenna beams from one orbital slot (i.e. the primary mission) to another orbital slot (i.e. the secondary mission). The present invention is useful in the case of a launch failure, a change in customer demands, or as an in-orbit spare for a previously launched satellite. FIG. 3 is an example of the orbit reconfiguration that can be achieved according to the present invention. FIG. 3 shows the original coverage for the 101 W orbital slot in a solid pattern, and the new coverage for the 119 W orbital slot in phantom. A common tracking site 10 is used to reposition the spacecraft and will be discussed hereinafter.

Figure 4:
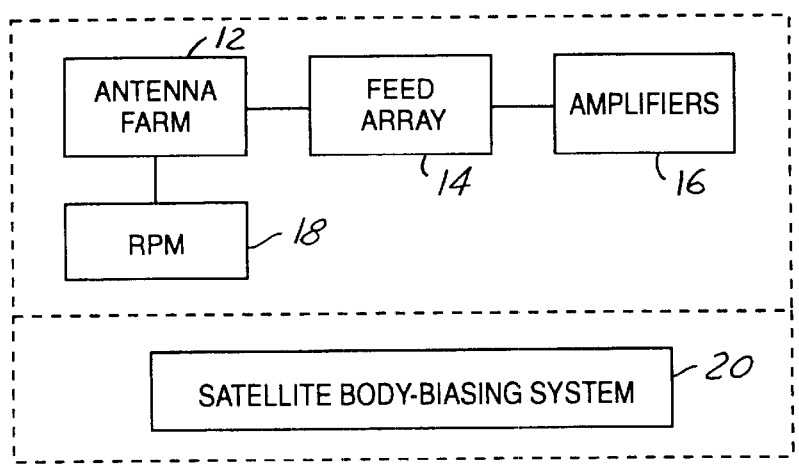
FIG. 4 is a block diagram of the spacecraft systems utilized in the method of the present invention.

FIG. 4 is a block diagram of the systems on the spacecraft that are used in the method of the present invention. The spacecraft (not shown) has an antenna farm 12, a feed array 14, a set of amplifiers 16 and a reflector pointing mechanism 18. Also, the spacecraft body-biasing system 20 is used in the method of the present invention. The details of the body-biasing system will not be discussed herein as several alternatives are available and known in the art. One of ordinary skill in the art is capable of using a body-biasing system according to the method of the present invention to accomplish the desired results.

Figure 5:
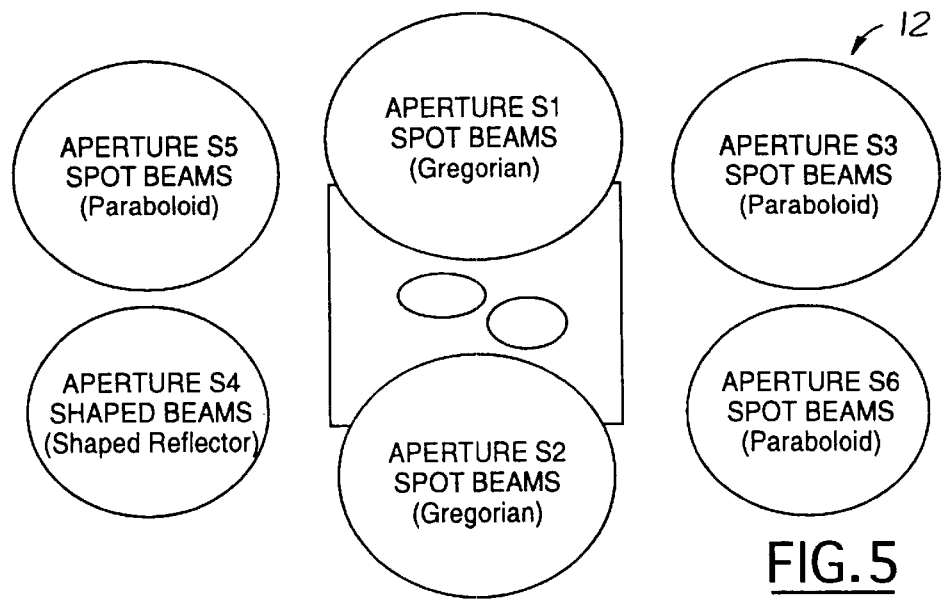
FIG. 5 is an example of an antenna farm that is used in conjunction with the method of the present invention.

The antenna farm 12 is shown in FIG. 5. The antenna farm 12 used on board a spacecraft consists of multiple reflector antennas where each reflector is fed with the feed array (not shown in FIG. 5) to generate multiple spot beams for the desired DMA coverage. It should be noted that the example shown in FIG. 5 is a typical example and not intended to limit the scope of the present invention. One skilled in the art is capable of using an antenna farm having a configuration other than the example shown and accomplish similar results according to the method of the present invention.

In the example shown in FIG. 5, reflectors S1, S2, S3, S5 and S6 are used for DMA coverage using multiple spot beams and the reflector S4 is used for shaped beam downlink coverage. Nadir reflectors 22 and 24 are shown. These are typically dual-reflector Gregorians, having a parabolic main reflector and ellipsoidal subreflector, to optimize their positioning on board the spacecraft relative to the feeds and minimize RF losses. Reflectors S3, S5 and S6 are typically single parabolic reflectors that use an offset configuration. The reflectors S1, S2, S3, S5 and S6 are used for generating spot beams for DMA coverage for both the primary and the secondary missions. Most of the feeds in the feed array are shared between the two missions in order to simplify hardware requirements. In some instances, there may be feeds that are dedicated to one or the other orbit.

The antenna farm 12 may consist of all single reflectors, all dual reflectors, or a combination of single and dual reflectors. Gimballing the main reflector of either the single or dual-reflector antenna reconfigures the beams. The size of the spot beams is changed by using different sized reflectors and varying the feed size.

Figure 6:
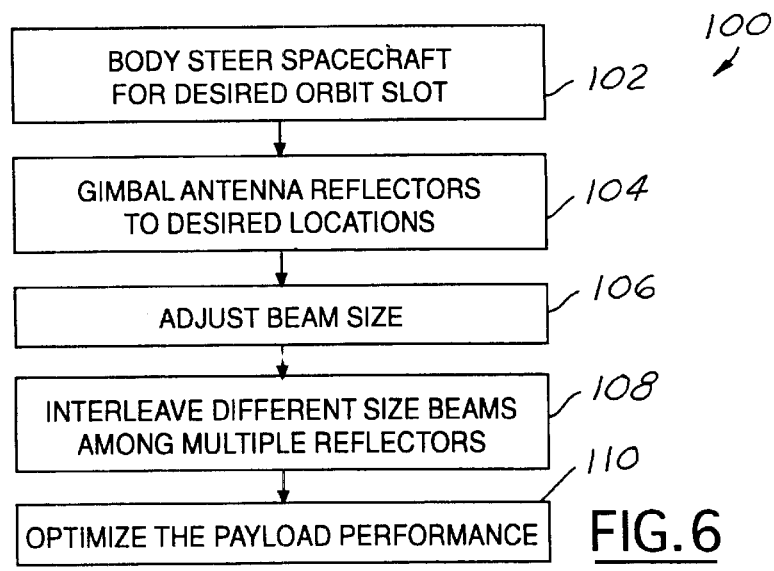
FIG. 6 is a flow chart of the method of the present invention.

According to the method 100 of the present invention, a flow chart of which is shown in FIG. 6, the reconfigurability is accomplished in two simple steps. First the spacecraft is body steered 102 for the desired mission using roll and pitch biases of the spacecraft. FIG. 3 shows the coverage from the primary and secondary orbits after the spacecraft body bias is changed from 101 W (shown in solid line) to 119 W (shown in phantom).

Referring still to FIG. 3, body steering the spacecraft minimizes the composite coverage area so that shaped beam performance can be maximized for either the primary or the secondary orbital slot. Further, body steering 102 allows the use of a common tracking site for both orbits. In the present example, the common tracking site 12 is Atlanta.

Referring again to FIG. 6, the antenna reflectors are gimballed 104 in order to steer beams to different locations for the desired mission. The beam size is then adjusted 106. Beam size control is achieved by using different size reflectors and varying the feed size. The main reflector of the single or dualreflector antenna is gimballed to steer the beams to different locations.

Figure 7:
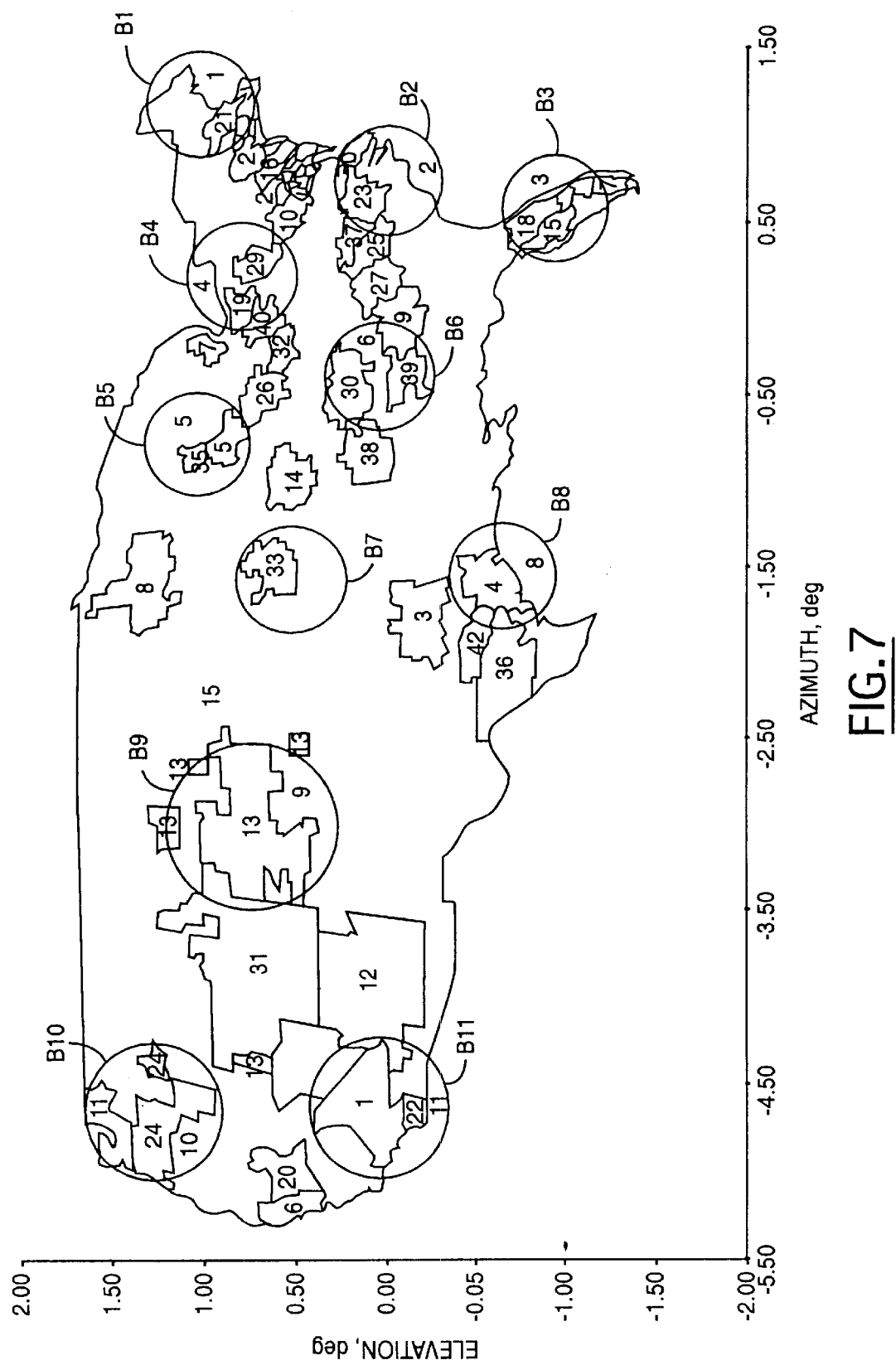
FIG. 7 is a typical beam layout and DMA coverage for the primary mission of the present example using eleven beams.

The operation of the present invention will be described with reference to the reflector S1 shown in FIG. 5. For the primary mission of the present example, Si uses eleven beams and covers sixteen DMA's. FIG. 7 is a diagram of the beam layout for Si for the primary mission at 101 W. The beams are labeled B1, B2, B3, B4, B5, B6, B7, B8, B9, B10 and B11 and are shown encircling the DMA's.

Figure 8:
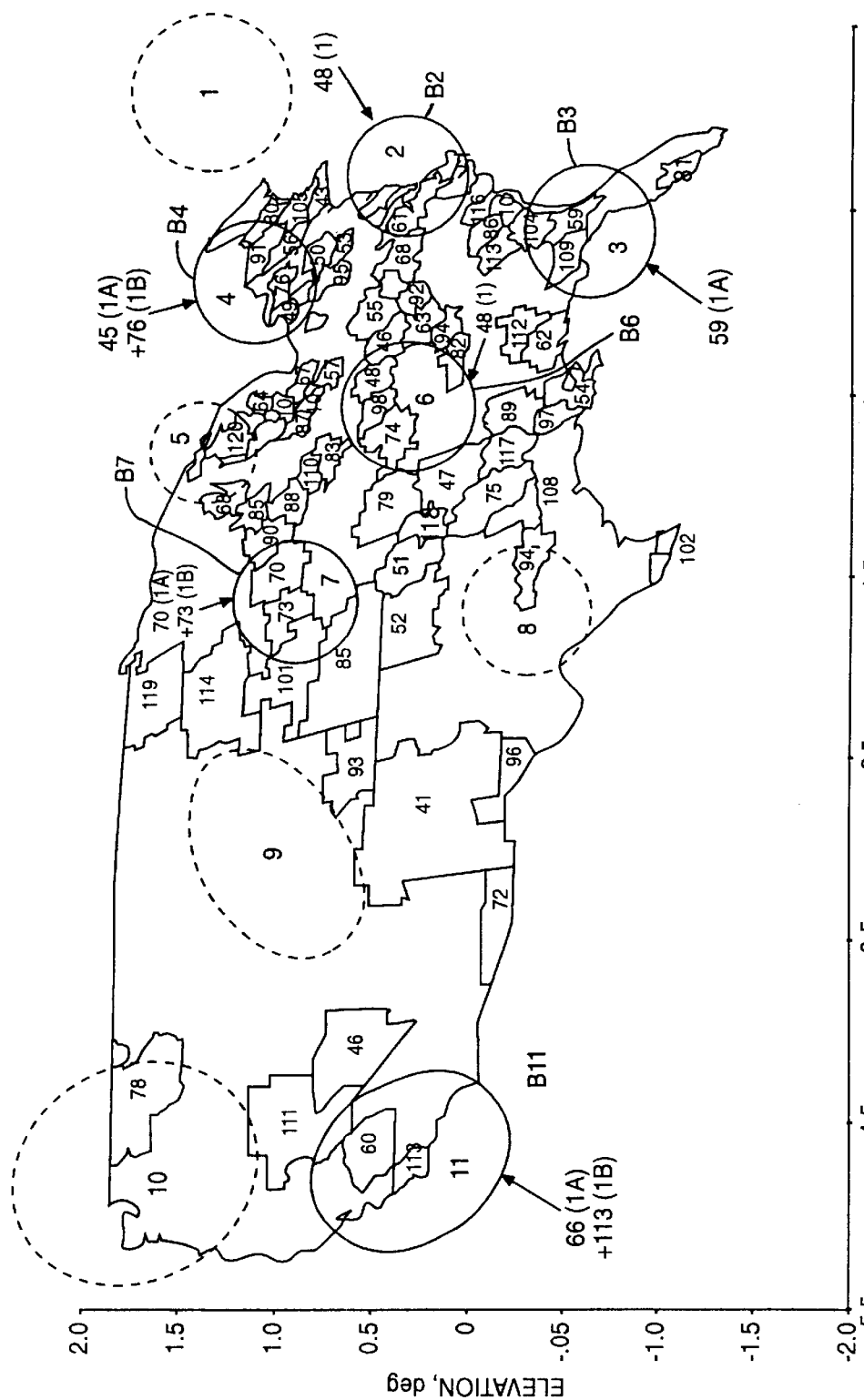
FIG. 8 is a typical beam layout and DMA coverage for the secondary mission of the present example re-using six of the eleven beams shown in FIG. 7 and according to the method of the present invention.

After applying the method of the present invention, the spacecraft is body biased to 2.185 degrees east and 0.114 degrees south for an orbital slot of 119 W. The main reflector of S1 is gimballed by 0.2 degrees to cover a different set of DMA's as shown in FIG. 8. FIG. 8 shows the beam layout of S1 as it is reconfigured for the backup mission. Six of the eleven feeds are reused. Specifically, B2, B3, B4, B6, B7 and B11 are reused and cover nine DMA's for the new orbital slot. Since the gimbal angle of the reflector is very small, 0.2 degrees in the present example, any deterioration of the beam patterns is very minimal for the secondary mission.

Figure 9:
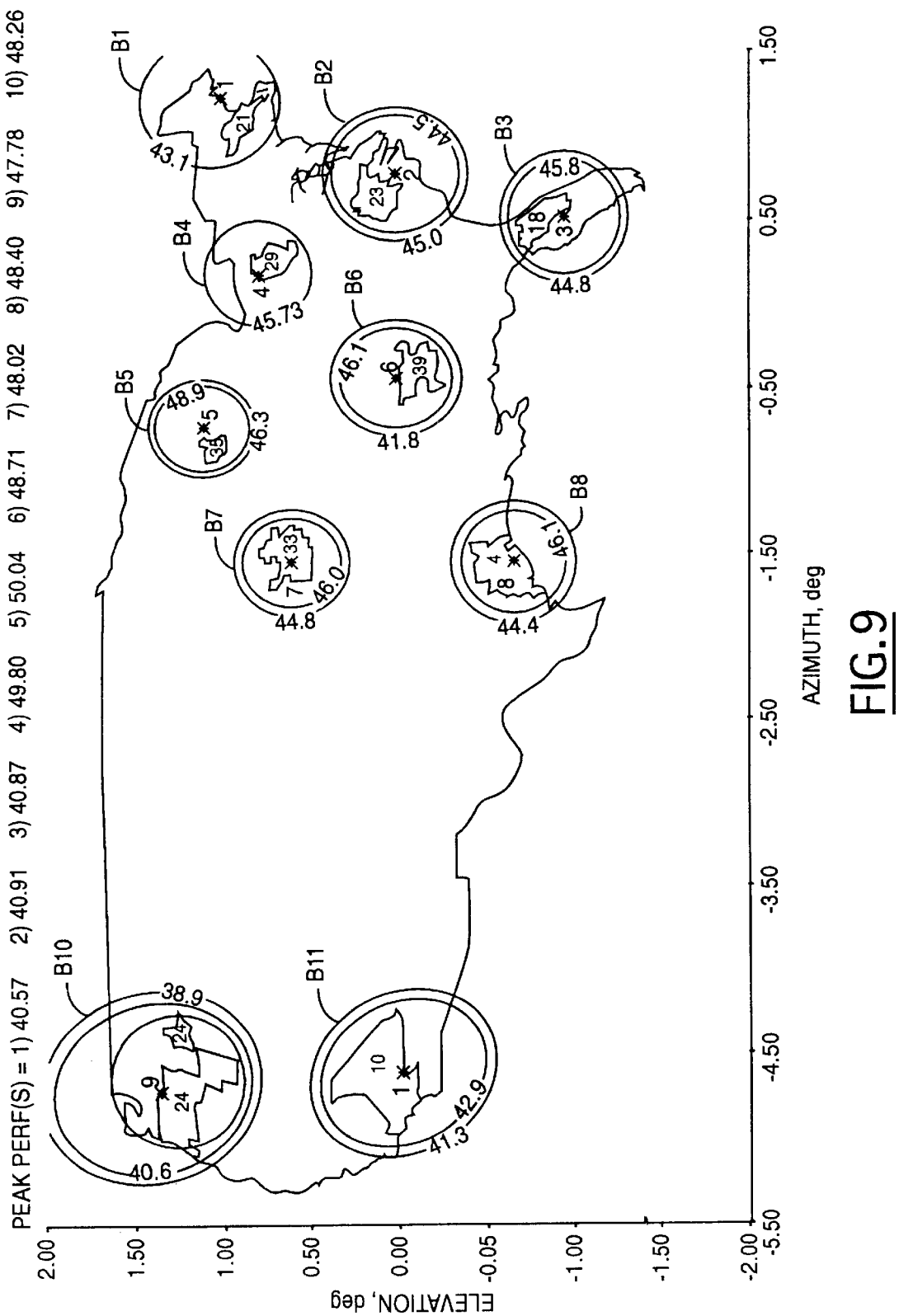
FIG. 9 is a diagram of a spot beam downlink antenna pattern for the primary mission of the present example.
Figure 10:
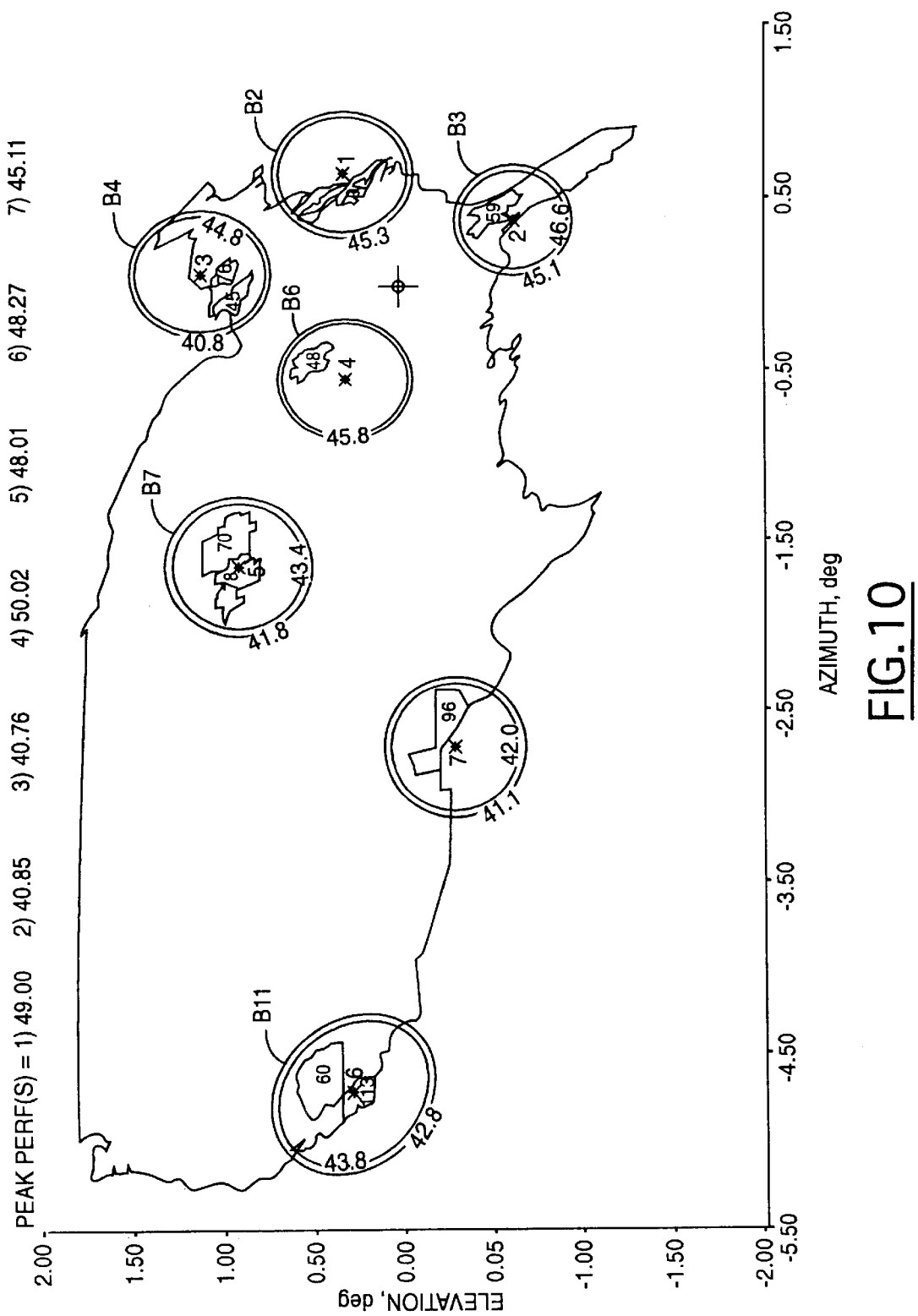
FIG. 10 is a diagram of a spot beam downlink antenna pattern for the secondary mission of the present example.

FIG. 9 shows computed spot beam directivity patterns for beams having the same frequency for 101 W orbit for each of the eleven beams B1 through B11. Most beams are using a frequency that is common for aperture S1. Comparing the patterns of FIG. 9 with FIG. 10, which shows the computed spot beam directivity patterns of beams having the same frequency, (most of them common for aperture S1), for 119 W orbit it is clear that the beams B2, B3, B4, B6, B7 and B11 that are reused have aggregate copolar isolation that is typically better than 12 dB.

For shaped beams, the present example is directed to reflector S4 shown in FIG. 5. In the present example, S4 is a single shaped reflector fed with a corrugated horn. This reflector is used to generate shaped beams for both the primary and the secondary missions. The surface of the reflector S4 is typically synthesized such that the directivity performance is optimized for both orbit locations and the shape is weighted to take into account rain-fade differential among various DMA's. According to the present invention, the shaped beams are steered as necessary once the spacecraft body biasing has been completed.

Figure 11:
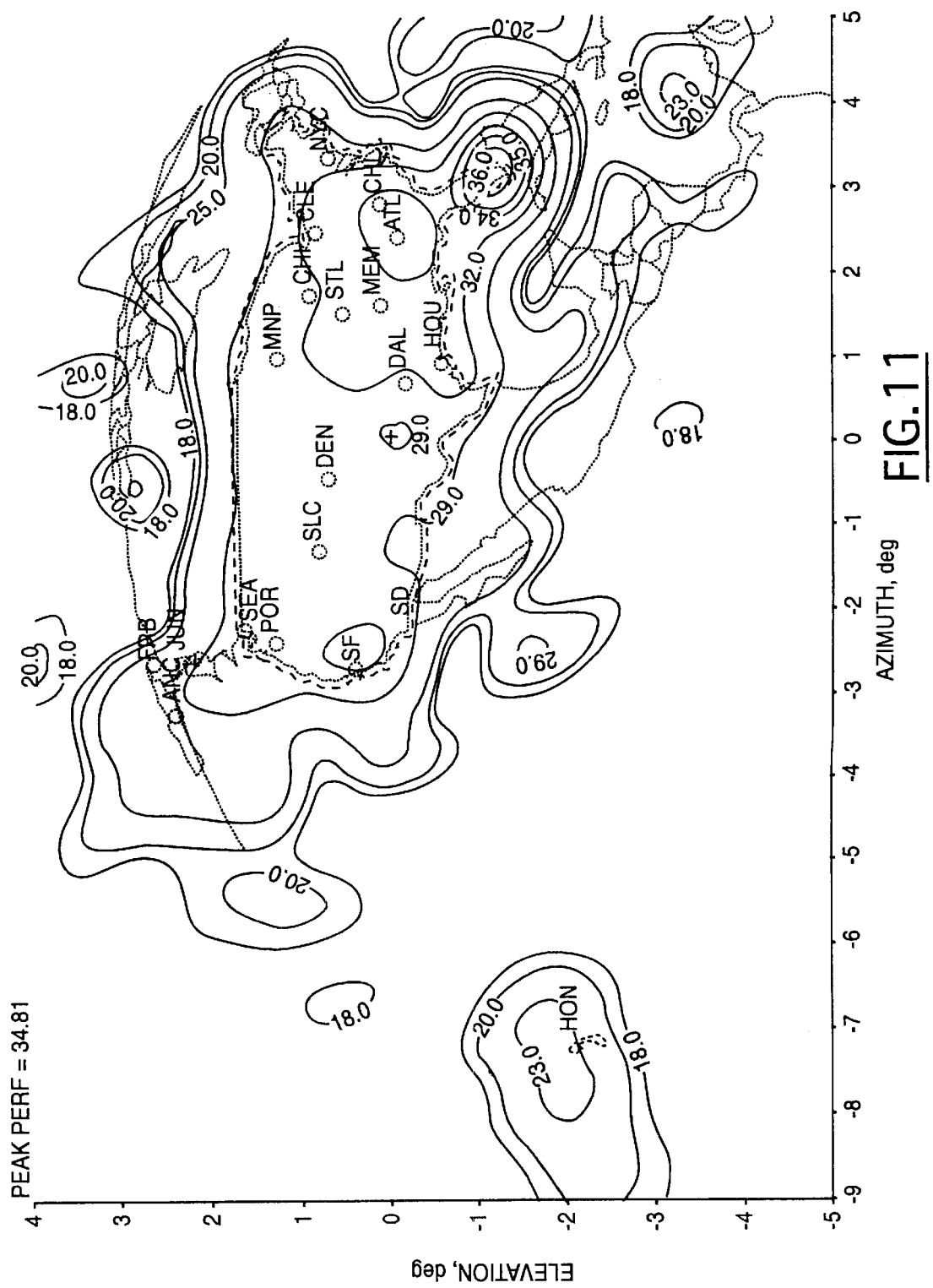
FIG. 11 is a diagram of computed directivity contours for the primary mission.
Figure 12:
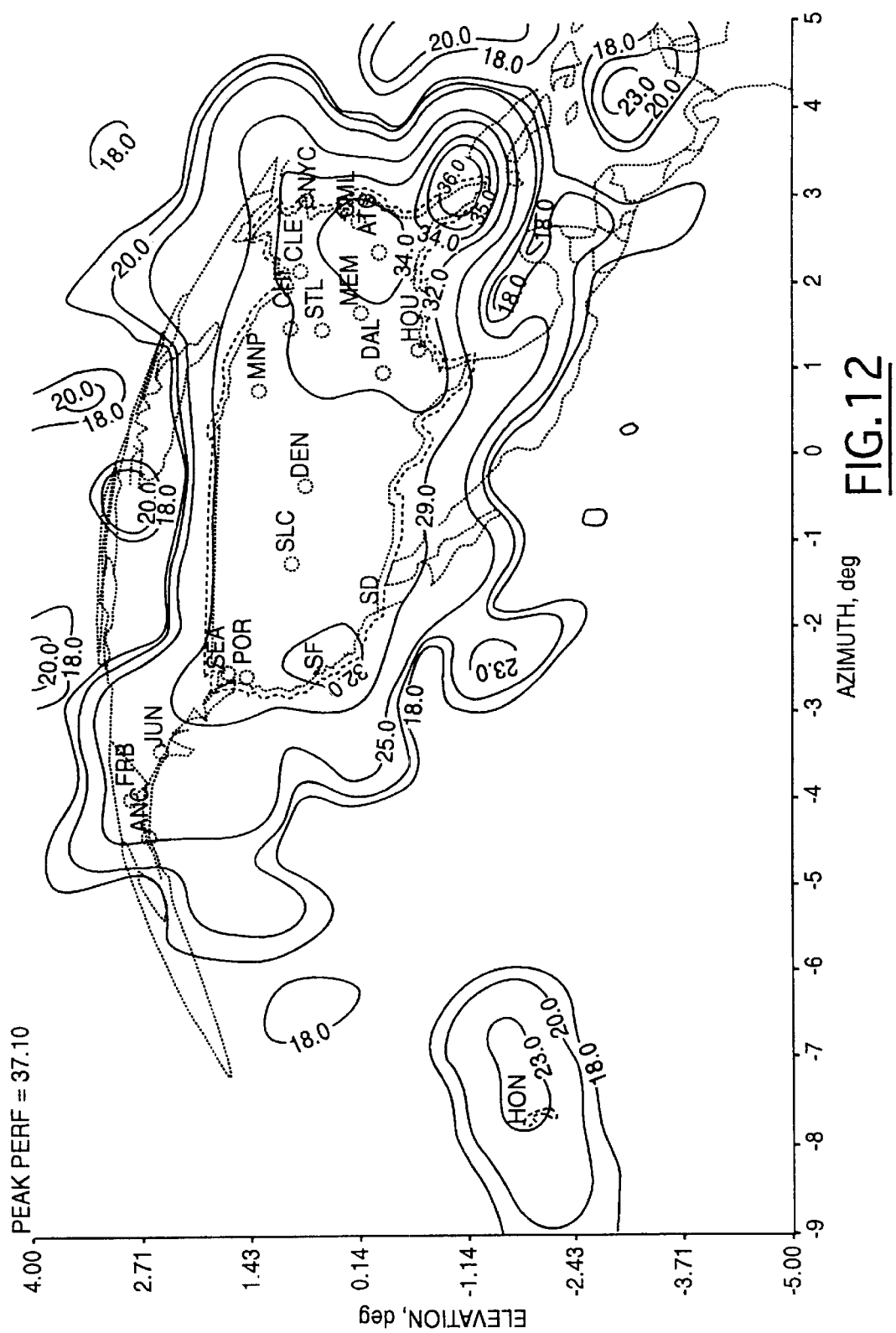
FIG. 12 is a diagram of computed directivity contours for the secondary mission.
Figure 13:
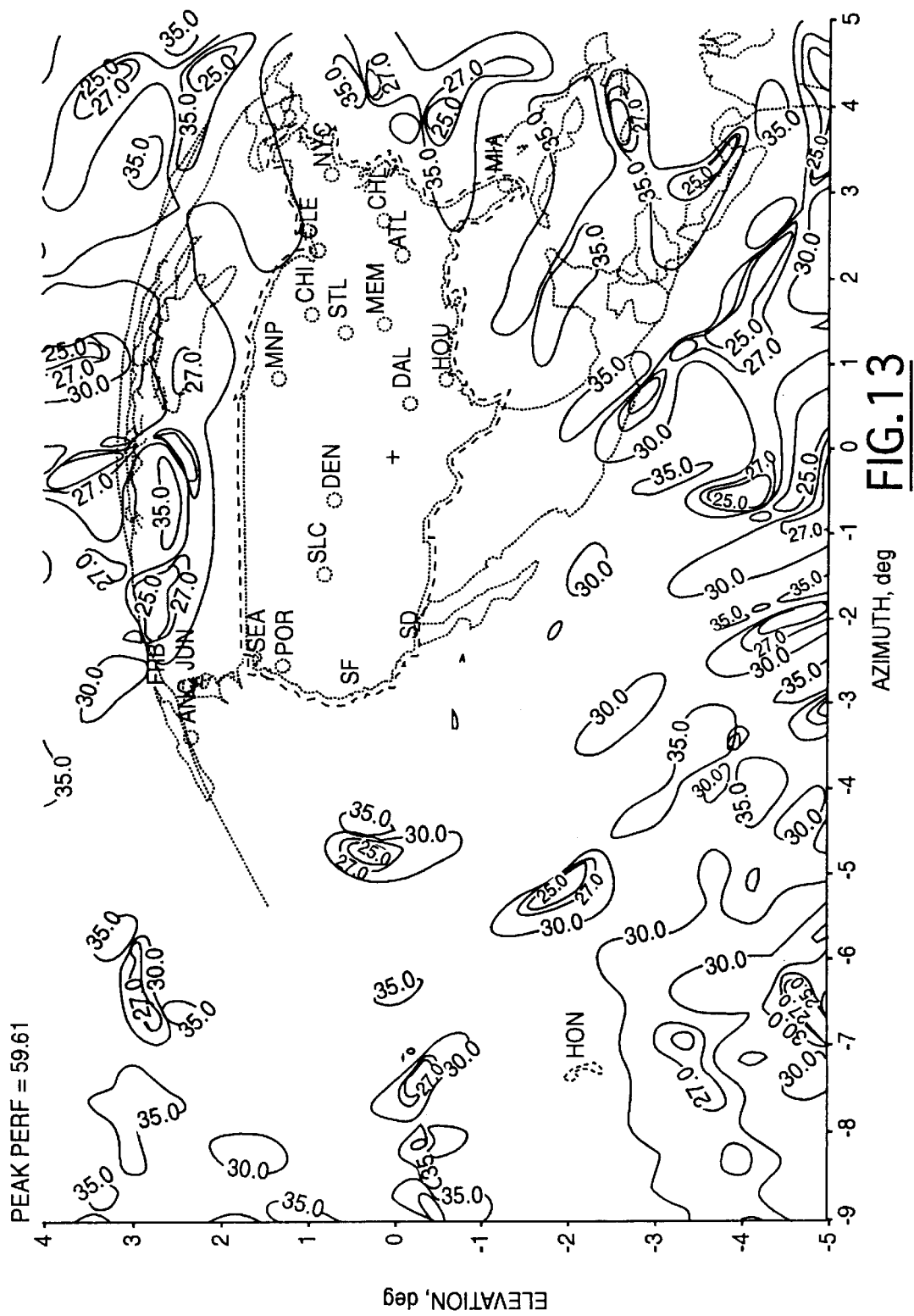
FIG. 13 is a diagram of cross-polar isolation contours for the primary mission.
Figure 14:
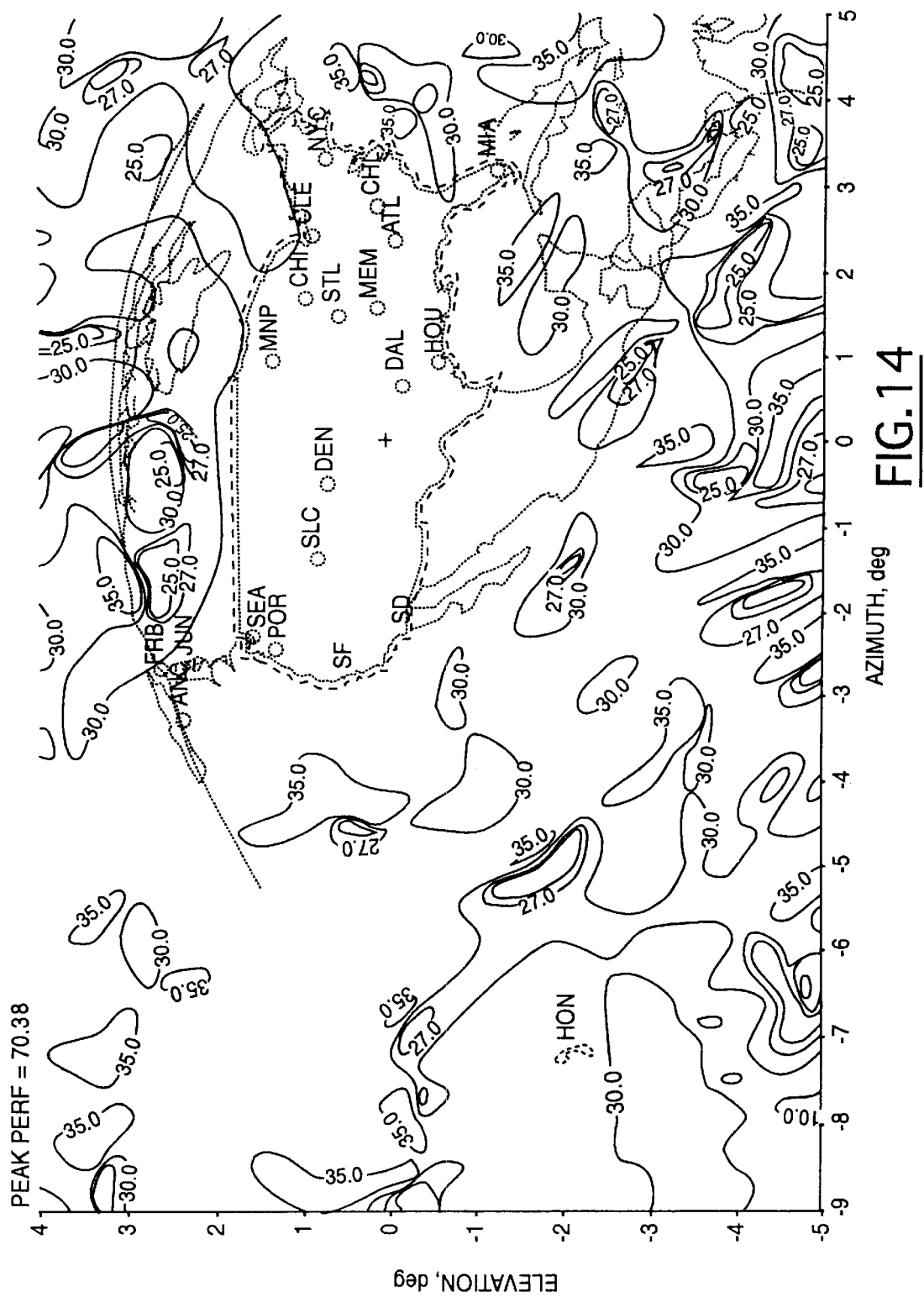
FIG. 14 is a diagram of cross-polar isolation contours for the secondary mission.

FIG. 11 shows the computed directivity contour for the primary mission at 101 W orbit and FIG. 12 shows the computed directivity contour of the shaped beam for the secondary mission at 119 W orbit. The cross-polar isolation contours for the shaped beam are shown in FIGS. 13 and 14, where FIG. 13 is representative of the primary mission and FIG. 14 is representative of the secondary mission. The cross-polar isolation contours shown in FIGS. 13 and 14 achieve better than 27 dB discrimination for the cross-polar signals.

The present invention is applicable to satellites requiring non-uniform beams with non-contiguous coverage over a service area as well as uniform beams with continuous coverage over a service area. Referring again to FIG. 6, non-uniform beam coverage is achieved by using different size beams and interleaving 108 them among multiple reflectors. The payload performance is optimized 110 after the spacecraft body is steered and the reflectors are gimbaled. Optimization of the payload performance can be accomplished by amplifying signals as needed.

The method of the present invention has several advantages over prior art reconfigurable antenna systems. First, due to the step of body steering, the beam reconfiguration is available over widely separated orbital slots. The body steering has the added advantage of allowing a single tracking site with a single beacon track antenna on the satellite, which minimizes hardware and the overall complexity of the satellite system.

Reflector gimballing is easily accomplished through the use of reflector pointing mechanisms on board the satellite. Further there is minimal degradation of the antenna beam patterns because of small gimbal angles required for the reflectors. Also, the shaped beams can be generated and reconfigured using a single reflector.

The method of the present invention allows common feed arrays to be used in both the primary and the secondary missions. A common set of amplifiers can be shared among common feeds, further simplifying the system.

It is noted that the present invention may be used in a wide variety of different implementations encompassing many alternatives, modifications, and variations, which are apparent to those with ordinary skill in the art. Accordingly, the present invention is intended to embrace all such alternatives, modifications and variations that fall within the spirit and scope of the appended claims.

What is claimed is:

1. A method for reconfiguring an antenna system of a satellite from a first orbital slot to a second orbital slot, the satellite having a body biasing system, an antenna farm having multiple reflectors of multiple sizes for generating spot and shaped beams, a feed array having varying feed sizes, and a reflector pointing mechanism, said method comprising the steps of:

body biasing a satellite from a first orbital slot to a second orbital slot using a tracking site for the second orbital slot that is the same as a tracking site used for said first orbital slot; and gimballing at least one reflector in said antenna system to steer beams to predetermined locations for said second orbital slot.

2. The method as claimed in claim 1 further comprising the step of generating a shaped beam for said second orbital slot using a single reflector that is also used for generating a shaped beam for said first orbital slot.

3. A method for reconfiguring an antenna system of a satellite from a first orbital slot to a second orbital slot, the satellite having a body biasing system, an antenna farm having multiple reflectors or multiple sizes for generating spot and shaped beams, a feed array having varying feed sizes, and a reflector pointing mechanism, said method comprising the steps of:

body biasing a satellite from a first orbital slot to a second orbital slot using a tracking site for the second orbital slot that is the same as a tracking site used for said first orbital slot;

gimballing at least one reflector in said antenna system to steer beams to predetermined locations for said second orbital slot; and adjusting beam size for said predetermined locations by using predeterined reflectors fed by the feed array having varying feed size.

4. The method as claimed in claim 3 further comprising the step of interleaving different sized beams among multiple reflectors in the antenna farm.

5. The method as claimed in claim 3 wherein said step of adjusting beam size further comprises using common feed arrays for both the first and second orbital slots.

6. The method as claimed in claim 5 further comprising the step of sharing a common set of amplifiers among common feeds for the first and second orbital slots.

* * * * *